United States Patent
Wu et al.

(10) Patent No.: US 12,302,363 B2
(45) Date of Patent: May 13, 2025

(54) INTEGRATED ACCESS BACKHAUL CONFIGURATION

(71) Applicant: Samsung Electronics Co., Ltd., Suwon-si (KR)

(72) Inventors: Shangbin Wu, Staines (GB); Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 560 days.

(21) Appl. No.: 17/250,909

(22) PCT Filed: Sep. 30, 2019

(86) PCT No.: PCT/KR2019/012710
§ 371 (c)(1),
(2) Date: Mar. 25, 2021

(87) PCT Pub. No.: WO2020/067829
PCT Pub. Date: Apr. 2, 2020

(65) Prior Publication Data
US 2021/0345321 A1   Nov. 4, 2021

(30) Foreign Application Priority Data

Sep. 28, 2018 (GB) .................................. 1815919
Jan. 11, 2019 (GB) .................................. 1900380

(51) Int. Cl.
*H04W 72/27* (2023.01)
*H04L 5/14* (2006.01)
(Continued)

(52) U.S. Cl.
CPC ............ *H04W 72/27* (2023.01); *H04L 5/14* (2013.01); *H04W 72/0446* (2013.01); *H04W 88/14* (2013.01)

(58) Field of Classification Search
CPC ... H04B 7/15528; H04B 7/15542; H04L 5/14; H04W 16/10; H04W 72/0446; H04W 84/18
See application file for complete search history.

(56) References Cited

U.S. PATENT DOCUMENTS

| 2010/0022309 A1* | 1/2010 | Yatsuzuka | A63F 13/352 463/42 |
| 2010/0097988 A1* | 4/2010 | Chung | H04W 56/0015 370/328 |

(Continued)

FOREIGN PATENT DOCUMENTS

| CN | 103703847 A | 4/2014 |
| CN | 105191196 A | 12/2015 |

(Continued)

OTHER PUBLICATIONS

Examination report dated Nov. 23, 2022, in connection with Indian Application No. 202137012439, 6 pages.

(Continued)

*Primary Examiner* — Zhensheng Zhang

(57) ABSTRACT

A method of operating an Integrated Access Backhaul, IAB, node in a wireless communication network is provided. The IAB node is arranged to communicate backhaul traffic wirelessly with a parent node and a child node. The method comprises: receiving a duplexing pattern configuration message from the parent node; transmitting a duplexing pattern configuration message to the child node; receiving a duplexing pattern configuration acknowledgment message from the child node; after receiving the duplexing pattern configuration acknowledgment message from the child node, applying a duplexing pattern contained within the duplexing pattern configuration message received from the parent (Continued)

node; and transmitting a duplexing pattern configuration acknowledgement message to the parent node.

10 Claims, 15 Drawing Sheets

(51) Int. Cl.
*H04W 72/0446* (2023.01)
*H04W 88/14* (2009.01)

(56) References Cited

U.S. PATENT DOCUMENTS

| | | | |
|---|---|---|---|
| 2015/0131495 A1 | 5/2015 | Zhang et al. | |
| 2016/0087781 A1 | 3/2016 | Eriksson et al. | |
| 2018/0352524 A1 | 12/2018 | Abedini et al. | |
| 2019/0104519 A1* | 4/2019 | Sydir | H04W 4/38 |
| 2020/0221470 A1* | 7/2020 | Sharma | H04W 76/10 |

FOREIGN PATENT DOCUMENTS

| | | |
|---|---|---|
| EP | 2713526 A1 | 4/2014 |
| WO | 2012103698 A1 | 8/2012 |
| WO | 2018222848 A1 | 12/2018 |

OTHER PUBLICATIONS

International Search Report and Written Opinion of the International Searching Authority in connection with International Application No. PCT/KR2019/012710 dated Jan. 14, 2020, 8 pages.
Combined Search and Examination Report dated Apr. 6, 2020 in connection with United Kingdom Application No. GB1815919.4, 10 pages.
Combined Search and Examination Report dated Jun. 17, 2019 in connection with United Kingdom Application No. GB 1900380.5, 4 pages.
AT&T, "Multi-connectivity Architecture Design for IAB Arch. 1a," R3-185153, 3GPP TSG-RAN WG3 Meeting #101, Gothenburg, Sweden, Aug. 20-24, 2018, 17 pages.
Ericsson, "IAB physical layer enhancement for backhaul link management," R1-1809231, 3GPP TSG-RAN WG1 Meeting #94, Gothenburg, Sweden, Aug. 20-24, 2018, 8 pages.
Huawei, et al., "Evaluation on the dynamic and flexible resource allocation in IAB," R1-1804303, 3GPP TSG RAN WG1 Meeting #92bis, Sanya, China, Apr. 16-20, 2018, 7 pages.
Huawei, et al., "Physical layer design for NR IAB," R1-1808101, 3GPP TSG RAN WG1 Meeting #94, Gothenburg, Sweden, Aug. 20-24, 2018, 14 pages.
Intel Corporation, "Overview on RAN1 related issues in IAB," R1-1804755, 3GPP TSG RAN WG1 #92bis, Sanya, China, Apr. 16-20, 2018, 15 pages.
LG Electronics, "Discussions on detection and measurement on IAB nodes," R1-1810274, 3GPP TSG RAN WG1 Meeting #94bis, Chengdu, China, Oct. 8-12, 2018, 6 pages.
LG Electronics, "Discussions on detection and measurement among IAB nodes," R1-1812565, 3GPP TSG RAN WG1 Meeting #95, Spokane, USA, Nov. 12-16, 2018, 4 pages.
Nokia, et al., "Discovery and measurements for IAB," R1-1810677, 3GPP TSG RAN WG1 Meeting #94-bis, Chengdu, P.R. China, Oct. 8-12, 2018, 7 pages.
Samsung, "Necessary Enhancements for NR IAB," R1-18129, 3GPP TSG RAN WG1 Meeting #95 81, Spokane, USA, Nov. 12-16, 2018, 9 pages.
Sony, "Discussion on Enhancements to support NR backhaul links," R1-1808339, 3GPP TSG RAN WG1 Meeting #94, Gothenburg, Sweden, Aug. 20-24, 2018, 5 pages.
Qualcomm Incorporated, "Enhancements to support NR backhaul links," R1-1807393, 3GPP TSG RAN WG1 Meeting #93, Busan, Korea, May 21-25, 2018, 15 pages.
ZTE, et al., "Multiplexing of IAB links," R1-1804504, 3GPP TSG RAN WG1 Meeting #92bis, Sanya, China, Apr. 16-20, 2018, 3 pages.
European Patent Office, "Supplementary European Search Report" dated Sep. 28, 2021, in connection with counterpart European Patent Application No. 19867166.1, 5 pages.
Qualcomm Incorporated, "Enhancements to support NR backhaul links", 3GPP TSG RAN WG1 Meeting #94, R1-1809442, Gothenburg, Sweden, Aug. 20-24, 2018, 19 pages.
The First Office Action dated Oct. 18, 2023, in connection with Chinese Application No. 201980062376.6, 15 pages.
Communication pursuant to Article 94(3) EPC dated Mar. 13, 2024, in connection with European Application No. 19867166.1, 6 pages.
The Second Ofice Action dated Jun. 28, 2024, in connection with Chinese Patent Application No. 201980062376.6, 16 pages.
Office Action dated Aug. 19, 2024, in connection with Korean Patent Application No. 10-2021-7012955, 10 pages.
Nokia, et al., "Resource allocation between backhaul and access links," R1-1808580, 3GPP TSG RAN WG1 Meeting #94, Gothenburg, Sweden, Aug. 20-24, 2018, 7 pages.
The Third Office Action dated Oct. 18, 2024, in connection with Chinese Application No. 201980062376.6, 10 pages.
Notification of the Decision to Grant a Patent Right for Patent for Invention dated Feb. 11, 2025, in connection with Chinese Application No. 201980062376.6, 7 pages.

* cited by examiner

FIG. 6

| $L_{P,DL}$ | $L_{P,UL}$ | $L_{A,DL}$ and/or $L_{C,DL}$ | $L_{A,UL}$ and/or $L_{C,UL}$ | $L_{P,DL}$ | $L_{P,UL}$ |
|---|---|---|---|---|---|
| 00 | 01 | 10 | 11 | 00 | 01 |

INTEGRATED ACCESS BACKHAUL CONFIGURATION

CROSS-REFERENCE TO RELATED APPLICATIONS

This application is a 371 National Stage of International Application No. PCT/KR2019/012710, filed Sep. 30, 2019, which claims priority to United Kingdom Patent Application No. GB1815919.4, filed Sep. 28, 2018, and United Kingdom Patent Application No. GB Patent Application No. 1900380.5, filed Jan. 11, 2019, the disclosures of which are herein incorporated by reference in their entirety.

BACKGROUND

1. Field

This invention relates to techniques for configuring Integrated Access Backhaul (IAB). In particular, certain examples relate to IAB configuration for a New Radio (NR) air interface of a wireless communication network, such as has been proposed for Fifth Generation (5G) wireless communication networks.

2. Description of Related Art

Wireless or mobile (cellular) communications networks in which a mobile terminal (UE, such as a mobile handset) communicates via a radio link with a network of base stations, or other wireless access points or nodes, have undergone rapid development through a number of generations. The 3rd Generation Partnership Project (3GPP) design, specify and standardise technologies for mobile wireless communication networks. Fourth Generation (4G) systems are now widely deployed.

3GPP standards for 4G systems include an Evolved Packet Core (EPC) and an Enhanced-UTRAN (E-UTRAN: an Enhanced Universal Terrestrial Radio Access Network). The E-UTRAN uses Long Term Evolution (LTE) radio technology. LTE is commonly used to refer to the whole system including both the EPC and the E-UTRAN, and LTE is used in this sense in the remainder of this document. LTE should also be taken to include LTE enhancements such as LTE Advanced and LTE Pro, which offer enhanced data rates compared to LTE.

The trend towards greater data throughput continues with 3GPP currently working to standardise Fifth Generation (5G) network technologies. As part of this, a new air interface is being developed, which may be referred to as 5G New Radio (5G NR) or simply NR. NR is designed to support the wide variety of services and use case scenarios envisaged for 5G networks, though builds upon established LTE technologies. One aspect of NR is the use of wireless backhaul to reduce network deployment costs and enhance network flexibility by allowing for the topology of the network to be reconfigured. For a conventional wireless communication network, such as LTE, base stations (referred to in LTE as enhanced Node Bs, eNBs) via connected to the core network via wired backhaul (BH) links. The base stations are responsible for communicating with mobile devices wirelessly such that those devices may access the core network. Alternatively, a base station may be connected to a core network via a dedicated point-to-point wireless link, quite separate from the process of allowing a device to wirelessly access the base station. As part of NR it is proposed that access for devices to the core network and wireless backhaul may be integrated, which may be referred to as Integrated Access Backhaul (IAB). That is, within a single transmission frame for an NR base station, referred to herein as an IAB node, both backhaul communications and mobile device access communications may be incorporated. It will be appreciated that transmission timing and coordination for IAB present challenges that have not been fully resolved.

IAB is a feature whereby the air interface between nodes or base stations is used to provide backhaul connectivity as well as access to User Equipment, UE. The configuration of such a system involves careful selection of signalling to ensure reliable and effective connectivity both between nodes and with UEs.

Certain network features have been agreed at a standardisation level. These are summarised below and serve to provide background information for the present invention. Physical layer specification [RAN1-led, RAN2, RAN3, RAN4]:

Specification of Synchronisation Signal Block (SSB)/ Remaining Minimum System Information (RMSI) periodicity for NR initial access assumed by an IAB-node.

Specification of extensions to Rel. 15 to support the use of SSBs orthogonal to SSBs used for UEs (via Time Division Multiplexing (TDM) and/or Frequency Division Multiplexing (FDM)), for inter-IAB-node discovery and measurements, including additional SSB-based RRM Measurement Timing Configuration (SMTC) periodicities and time-domain mapping of SSB locations (e.g. enable muting patterns to deal with half-duplex constraint).

Specification of extension of Random Access Channel (RACH) occasions and periodicities for backhaul RACH resources. w.r.t. access RACH resources, and associated network coordination mechanisms for selection of such parameters (in order to orthogonalize access and Backhaul (BH) due to the half-duplex constraints i.e. that nodes are unable to transmit and receive simultaneously).

Specification of mechanisms for resource multiplexing among backhaul and access links. This includes:

Specification of semi-static configuration for IAB-node/ IAB-donor Distributed Unit (DU) resources in case of TDM operation subject to half-duplex constraint. This shall be forward compatible to allow the support of half-duplex scenarios with FDM and Spatial Division Multiplexing (SDM) resource sharing among backhaul and access links.

Specification of time resource types for the DU's child links: DL hard, DL soft, UL hard, UL soft, Flexible hard, Flexible soft, Not Available Specification of dynamic indication (L1 signalling) of the availability of soft resources for a child IAB-node DU Specification of required transmission/reception rules for IAB-nodes and associated behaviours regarding time resource utilization as discussed in TR 38.874 clause 7.3.3.

Specification of mechanism to support the "case-1" OTA timing alignment.

During SI, the following agreement was made in RAN1 #94 and RAN1 #95 as follows.

Agreements:

Solution 1-B means SSB, that may get muted, for inter-IAB cell search and measurement in stage 2 is not on the currently defined sync raster for a SA frequency layer, while for a Non-standalone (NSA) frequency layer the SSBs are transmitted outside of the SMTC configured for access UEs Solution 1-A means SSB for inter-IAB cell search in stage 2 is on the currently defined sync raster for a SA frequency layer, while for a NSA frequency layer the SSBs are transmitted inside of the SMTC configured for access UEs Agreements:

An IAB node should not mute SSB transmissions targeting UE cell search and measurement when doing inter-IAB cell search in stage 2

For Standalone (SA), means that SSBs transmitted on the currently defined sync raster follows the currently defined periodicity for initial access Means that Solution 1-B implies SSB, that may get muted, for inter-IAB stage 2 cell search is at least TDM with SSB used for UE cell search and measurements Agreements:

Solution 1-A and Solution 1-B are both supported

Enhancements for off-raster SSB, e.g. new periodicities and time-domain mapping can be considered Agreements:

Capture the following conclusions for the IAB SI TR:

RAN1 has studied various physical layer aspects for Integrated Access and Backhaul, and from a RAN1 perspective, support for the following features and solutions has been determined to be beneficial and feasible:

Mechanisms for discovery of IAB nodes and management of backhaul links in both SA and NSA deployments, taking into account the half-duplex constraint at an IAB node and multi-hop topologies, including:

Solutions reusing the same set of SSBs used for access UEs and solutions which use of SSBs which are orthogonal (TDM and/or FDM) with SSBs used for access UEs.

One of the main objectives for IAB is to provide RAN-based mechanisms to support dynamic route selection to accommodate short-term blocking and transmission of latency-sensitive traffic across BH links under half-duplex constraint. There are three RA (Resource Allocation) modes defined, namely TDM, FDM and SDM. No matter which RA scheme is applied, there always exists a problem for IAB node discovery and measurement, especially for mmWave where the links can be easily blocked. For the SSB based solution, it has been agreed that two sub-solutions will be supported:

Solution 1-A) Reusing the same set of SSBs used for access UEs:

In this case, the SSBs for inter-IAB cell search in stage 2 are on the currently defined sync raster for a SA frequency layer, while for a NSA frequency layer the SSBs are transmitted inside of the SMTC configured for access UEs.

Solution 1-B) Use of SSBs which are orthogonal (TDM and/or FDM) with SSBs used for access UEs:

In this case, the SSBs, that may get muted, for inter-IAB cell search and measurement in stage 2 are not on the currently defined sync raster for a SA frequency layer, while for a NSA frequency layer the SSBs are transmitted outside of the SMTC configured for access UEs.

SUMMARY

Embodiments of the present invention aim to address problems identified in the prior art, whether mentioned herein or not. In particular, embodiments of the invention aim to provide inter-node discovery and measurement techniques for IAB nodes subject to half-duplex constraint.

It is an aim of certain examples of the present invention to address the issue of transmission timing and coordination for IAB.

According to a first aspect of the present invention there is provided a method of operating an Integrated Access Backhaul, IAB, node in a wireless communication network, the IAB node being arranged to communicate backhaul traffic wirelessly with a parent node and a child node, the method comprising: receiving a duplexing pattern configuration message from the parent node; transmitting a duplexing pattern configuration message to the child node; receiving a duplexing pattern configuration acknowledgment message from the child node; after receiving the duplexing pattern configuration acknowledgment message from the child node, applying a duplexing pattern contained within the duplexing pattern configuration message received from the parent node; and transmitting a duplexing pattern configuration acknowledgement message to the parent node. The configuration of different duplexing patterns provides enhanced flexibility and can be crucial in many scenarios. When the loads in uplink and downlink are changed, configuring a new duplexing pattern can satisfy the changing loads in uplink and downlink to provide better quality of service (QoS) levels. When two IAB nodes have significant cross link interference mutually, reconfiguration of duplexing pattern can reduce this interference.

According to a second aspect of the present invention there is provided an Integrated Access Backhaul, IAB, node in a wireless communication network, the IAB node being arranged to communicate backhaul traffic wirelessly with a parent node and a child node and further arranged to execute the above method.

According to a third aspect of the present invention there is provided a computer readable storage medium having stored thereon computer executable instructions which when executed by a computer cause the computer to perform the above method.

According to a fourth aspect of the present invention, there is provided a method of configuring a node in a telecommunication network, wherein the node is operable to perform Integrated Access and Backhaul, IAB, comprising the step of: selectively muting one or more SSB transmissions, such that during the muting, the node is able to monitor an SSB transmission from another node.

In an embodiment, one or more SSB transmissions are selectively muted on an individual SSB basis and/or on a burst set basis.

In an embodiment, the one or more SSB transmissions are muted in a complementary manner between any two given nodes.

In an embodiment, one or more neighbouring nodes exchange SSB configuration information and adjust their SSB configurations accordingly.

In an embodiment, a donor or parent node provides an SSB configuration for all child nodes or its next-level child nodes.

In an embodiment, the selective muting is performed such the node and any connected nodes are collaboratively muted.

In an embodiment, the selective muting is performed such that only nodes in the same hop are collaboratively muted.

In an embodiment, the muting and an SSB configuration depend on topology and can be configured/reconfigured in a semi-persistent manner by upper layer signalling or in a dynamic manner.

In an embodiment, an SMTC orthogonal to an access UE SMTC is provided to allow a node to measure SSB of a neighbouring node such that an additional SMTC is configured in both RRC-connected and RRC idle states.

In an embodiment, some or all of the information included in PBCH is removed or muted from SSB.

In an embodiment, the node Mobile Terminal, MT, assumes an SSB configuration and SSB measurement periodicity different from those assumed when accessing the network for the first time.

In an embodiment, the node is operable to perform Integrated Access and Backhaul, IAB, with a state indicator to differentiate IAB MT from access UE.

Another aspect of the present invention provides a computer program comprising instructions arranged, when executed, to implement a method and/or apparatus in accordance with any one of the above-described aspects. A further aspect provides machine-readable storage storing such a program.

The disclosure provides inter-node discovery and measurement techniques for IAB nodes subject to half-duplex constraint. Certain examples of the disclosure address the issue of transmission timing and coordination for IAB.

BRIEF DESCRIPTION OF THE DRAWINGS

Embodiments of the invention are further described hereinafter with reference to the accompanying drawings, in which:

FIG. 6 illustrates an example of a signalling procedure for duplexing pattern configuration messaging;

DETAILED DESCRIPTION

Embodiments of the present invention will now be described in the context of a 5G wireless communication network, and in particular a NR radio access network forming part of a 5G wireless communication network. It will be understood that the present invention is not limited to any particular radio access technology. That is, the concept of IAB where backhaul traffic and network access traffic share a transmission frame is equally applicable in other wireless communication systems where it is desirable to deploy base stations with wireless backhaul. References to particular 3GPP constructs in certain examples should not be understood as limiting the ability of the invention to be applied to other wireless communication networks.

The principles of Integrated Access Backhaul will now be described in greater with reference to FIG. 1. In integrated access backhaul (IAB) within a wireless communication network, an IAB node will be connected to a parent node and one or more child nodes. That is, each IAB node is allowed to have multiple child nodes. Each IAB node comprises a base station which permits radio access by a device to the network, and performs backhaul communications to communicate access data with the core network.

Figure 1:
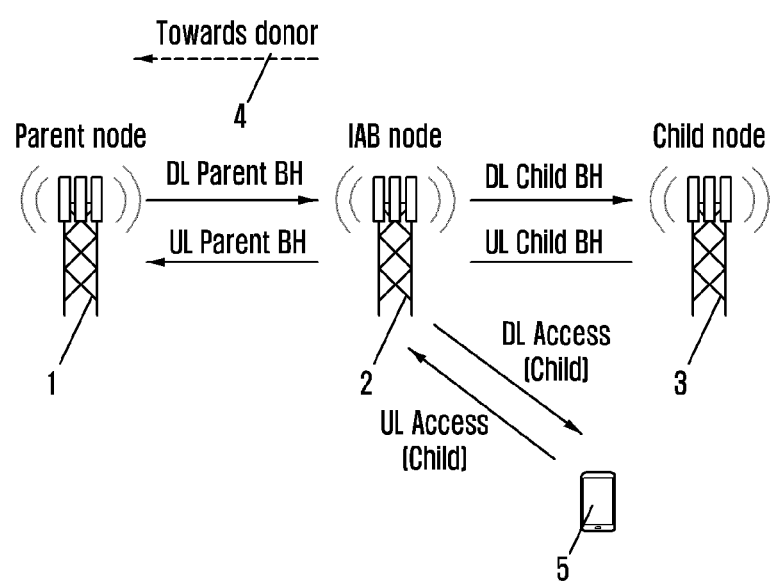
FIG. 1 illustrates an arrangement of three IAB nodes.

FIG. 1 illustrates three nodes: a parent node 1, an IAB node 2 and a child node 3. It will be appreciated that each of nodes 1 to 3 may be identical IAB nodes and that the notations "parent" and "child" in FIG. 1 are relative only to a particular IAB node (in this case, node 2). That is, for child node 3, its parent node is node 2 and its child node is not illustrated, but logically would appear to the right in the arrangement of FIG. 1. As an exception to this, for each IAB chain of nodes there will be a first node which has a wired or dedicated wireless connection to the core network, and this node may be referred to as a donor node. A donor node does not have a parent node, but acts as the parent node in respect of its child node (or each of its child nodes if it has multiple child nodes). A further exception is that there will be an IAB node which does not have a backhaul connection to any subsequent child node. FIG. 1 does not illustrate a donor node, but logically it would appear to the left of the arrangement of FIG. 1 as indicted by arrow 4. As noted above, a further exception is that an IAB node may have more than one child node. The IAB configuration techniques disclosed herein apply equally to an IAB node having more than one child node.

FIG. 1 further illustrates an access device wirelessly communicating with IAB node 2. Equally, further access devices may wirelessly communicate with nodes 1 and 3. For the particular example of IAB node 2, this topology results in backhaul (BH) downlink (DL) and uplink (UL) communications with the parent node 1 and the child node 3, and access DL and UL communications with the mobile device 5.

The 3GPP RAN1 working group, meeting #94 in Gothenburg, Sweden on 20 Aug. 2018 agreed upon Time Division Multiplexing (TDM) of BH links and access links for IAB nodes. Specifically, for IAB node TDM, at least the following cases were agreed to be supported as shown in Table 1:

TABLE 1

Cases agreed in RAN1 #94.

| | TDM Between: | | |
|---|---|---|---|
| Case | Link 1 | Link 2 | Supported by a pattern? |
| 1 | $L_{P, DL}$ | $L_{C, DL}$ | Yes |
| 2 | $L_{P, UL}$ | $L_{C, UL}$ | Yes |
| 3 | $L_{P, DL}$ | $L_{C, UL}$ | Yes |
| 4 | $L_{P, UL}$ | $L_{C, DL}$ | Yes |
| 5 | $L_{P, DL}$ | $L_{A, DL}$ | Yes |
| 6 | $L_{P, UL}$ | $L_{A, UL}$ | Yes |
| 7 | $L_{P, DL}$ | $L_{A, UL}$ | Yes |
| 8 | $L_{P, UL}$ | $L_{A, DL}$ | Yes |
| 9 | $L_{P, DL}$ | $L_{A, DL}$ and $L_{C, DL}$ | Yes |
| 10 | $L_{P, UL}$ | $L_{A, UL}$ and $L_{C, UL}$ | Yes |

TABLE 1-continued

Cases agreed in RANI #94.

| | TDM Between: | | |
|---|---|---|---|
| Case | Link 1 | Link 2 | Supported by a pattern? |
| 11 | $L_{P, DL}$ | $L_{A, UL}$ and $L_{C, UL}$ | Yes |
| 12 | $L_{P, UL}$ | $L_{A, DL}$ and $L_{C, DL}$ | Yes |
| 13 | $L_{C, DL}$ | $L_{A, DL}$ | * At least Rel. 15 mechanisms can be used, FFS enhancements |
| 14 | $L_{C, UL}$ | $L_{A, UL}$ | * At least Rel. 15 mechanisms can be used, FFS enhancements |
| 15 | $L_{C, DL}$ | $L_{A, DL}$ | * At least Rel. 15 mechanisms can be used, FFS enhancements |
| 16 | $L_{C, UL}$ | $L_{A, DL}$ | * At least Rel. 15 mechanisms can be used, FFS enhancements |

In Table 1 the requirements for TDM between two links are given for 16 different cases. For each link the notation Lx,y is given, where x indicates the party that an IAB node is communication with (P—parent node; C—child node; A—access, that is a device wirelessly accessing the network) and y indicates whether traffic is uplink (UL) or downlink (DL). For instance, LP,DL indicates downlink BH communication from the parent node and LC,UL indicates uplink BH communication from the child node. It will be noted that cases 9 to 12 indicate that in certain cases uplink or downlink communication may be shared between an access device and a child node for link 2. Table 1 indicates the possible scenarios in which a node may transmit and receive at the same time—that is where link 1 and link 2 may be in use at the same time. For current IAB technology it remains challenging for a node to transmit and receive at the same time. A more practical arrangement, provided by Table 1, is for a node to either send or receive at any instant. That is, the specified links for each case show that two different uplink or downlink links may be applied at the same time. Time sharing may be provided at the symbol level.

Column 4 indicates whether there is a need to define a pattern for TDM for links 1 and 2 for each case. It will be noted that for cases 13 to 16 both links are with a child node and an access device: there is no link with a parent node. 3GPP Release 15 standard mechanisms may be applied to determine TDM between the two links. However, it will be noted that for cases 1 to 12 it has been agreed only that a pattern is required for TDM between links 1 and 2, but currently no method for determining a suitable pattern has been agreed. There is a need to design mechanisms for implementing TDM between links 1 and 2, and particularly there is a need to identify a way of designing patterns for integrating BH and access data at an IAB node.

The 3GPP RAN1 working group has agreed that a given pattern may include simultaneous support for multiple cases though not how this may be implemented. Table 1 identifies two types of links that may be simultaneously supported, though at any given time there may be multiple instances of each type of link: for instance communicating with multiple child nodes and/or access devices. Similarly, there is agreement that each IAB node may be configured with IAB node specific resources with time available for the links, but no agreement on the details of the adaptation period and granularity (e.g. slot/symbol/subframe level) of the pattern provided to the IAB node, nor how resources may be explicitly or implicitly indicated or a suitable signalling mechanism to provide the necessary TDM patterns at each IAB node.

Different duplexing patterns are supported in NR (as shown in Table 2, below and derived from 3GPP TS 38.211; "NR; Physical channels and modulation", version 15.3.0 dates September 2018, and available at https://portal.3gpp.org/desktopmodules/Specifications/SpecificationDetails.aspx?specificationId=3213). However, duplexing patterns for TDM of BH links and access links is not currently supported. It can be seen in Table 2 that 61 different duplex patterns are defined for downlink (D) and uplink (U) data in different symbols within a timeframe slot are defined, where X indicates that a symbol is not to be used (that is, the symbol is empty). The formats indicated in rows 0 or 61 of Table 2 are for use by a node for access traffic only: that is, they do not encompass wireless BH and so cannot support IAB nodes. Formats 62 to 255 are reserved for future use. There is a clear need to define how TDM for BH links and access links may be achieved without causing collision between BH links to a parent node and a child node.

TABLE 2

Formats defined by 3GPP TS 38.211.

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| ... | ... | ... | ... | ... | ... | ... | ... | ... | ... | ... | ... | ... | ... | ... |
| 61 | D | D | X | X | X | X | U | D | D | X | X | X | X | U |
| 62-255 | Reserved | | | | | | | | | | | | | |

It is an aim of certain embodiments of the present invention to propose a procedure for achieving duplexing pattern configurations and necessary signalling. It is a further aim of certain embodiments of the present invention to propose design principles of duplexing pattern design for TDM of BH links and access links. Certain embodiments of the present invention provide for enhanced flexibility with dynamic duplexing pattern configuration.

Figure 2A:
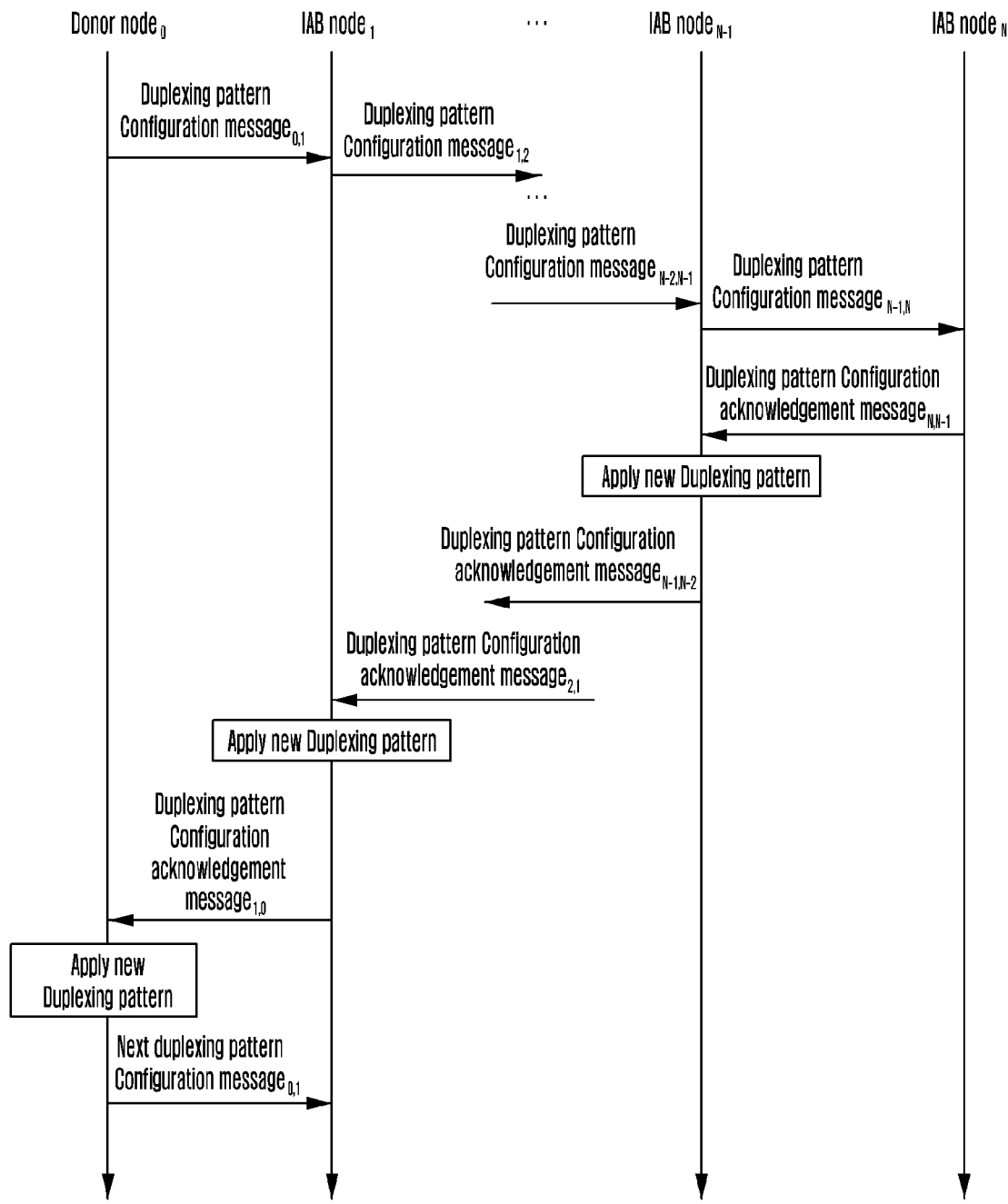
FIGS. 2A-D illustrates a general procedure for passing configuration messages within an IAB network comprising a donor node and N IAB nodes.

Referring now to FIG. 2A, this illustrates an example of a general IAB configuration messaging procedure. FIG. 2A illustrates a donor node 0 (as discussed above, as a node which is directly coupled to the core network) and N IAB nodes, where N is a real number. IAB nodeN has no child node. Particularly, the donor node may be a macro/micro node which is connected to wired backhaul. For each IAB node, backhauling is done wirelessly. Each node transmits a duplexing pattern configuration message to its child node. For example, node 0 transmits message01 to node 1. Each node returns a duplexing pattern configuration acknowledgement message to its parent node. For example, node N transmits acknowledgement messageN,N−1 to node N−1. On receipt of an acknowledgment message from its child node, an IAB node applies the new duplexing pattern that it received earlier from its parent node prior to transmitting an acknowledgement message to its parent node. It will be appreciated that by waiting until its child node has acknowledged the configuration message (and hence until after the child node has applied the new duplexing patter) it can be ensured that an IAB node does not begin using a new duplexing configuration including for communication with its child node before the child node is ready to correctly receive communications from the IAB node. This prevents an attempt being made to transmit data to a child node until it is ready to receive it.

It will be appreciated that where an IAB node has multiple child nodes then it will wait until acknowledgement messages have been received from each child node before applying the new duplexing pattern itself. There is no limit to the length of a chain of IAB nodes. However, it will be appreciated that the greater the number of IAB nodes, the larger the time delay between donor node 0 transmitting a configuration message and receiving an acknowledgement message.

The process of waiting for an acknowledgement message from a child node before applying a duplexing pattern received from a parent node may be referred to as configure-and-wait. Particularly, the donor node will transmit a duplexing pattern configuration message to its child node. The donor node will not reconfigure or apply the new configuration until it has received the feedback from its child.

Figure 2B:
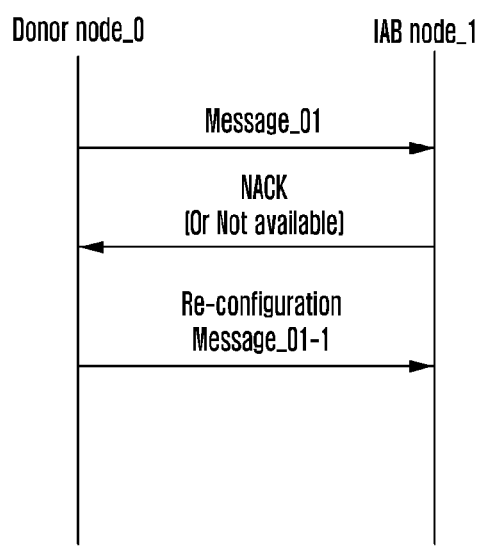

There may be cases when the duplexing configuration is not successful. One example is that a child node responds with a non-acknowledgement (NACK)/not-available to its parent on the duplexing pattern configuration, due to message packet loss or unavailability of configuration. In this case, the parent node can transmit another configuration message, with the same duplexing pattern, or a different duplexing pattern with the same duplexing granularity (slot/subframe/symbol levels. This is illustrated in FIG. 2B which shows additional messages NACK and Re-configuration Message_01-1 which follow Message_01 and which precede the Duplexing pattern configuration message sent from IAB node1 shown in FIG. 2A.

Figure 2C:
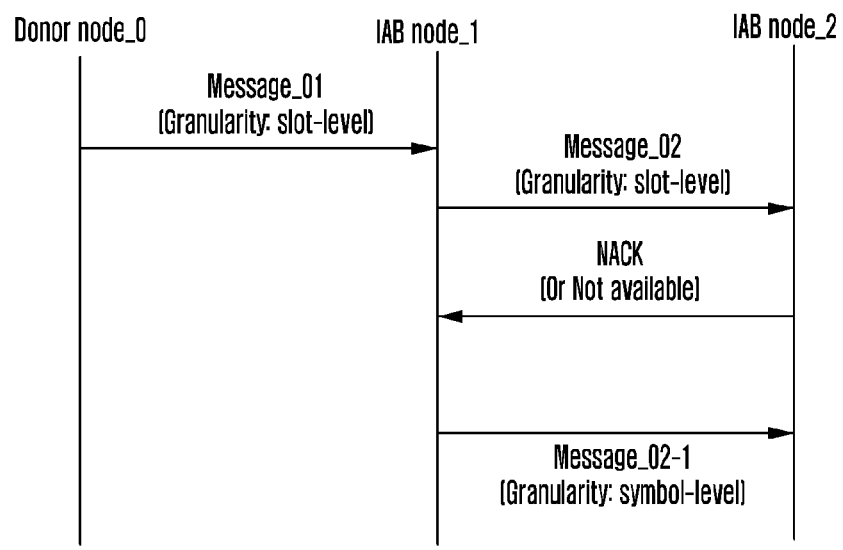

Alternatively, a different duplexing pattern with a different duplexing granularity (slot/subframe/symbol levels) may be required. This is as shown in FIG. 2C which shows the additional messages sent after Message_01 in a similar manner to those shown in FIG. 2B.

Figure 2D:
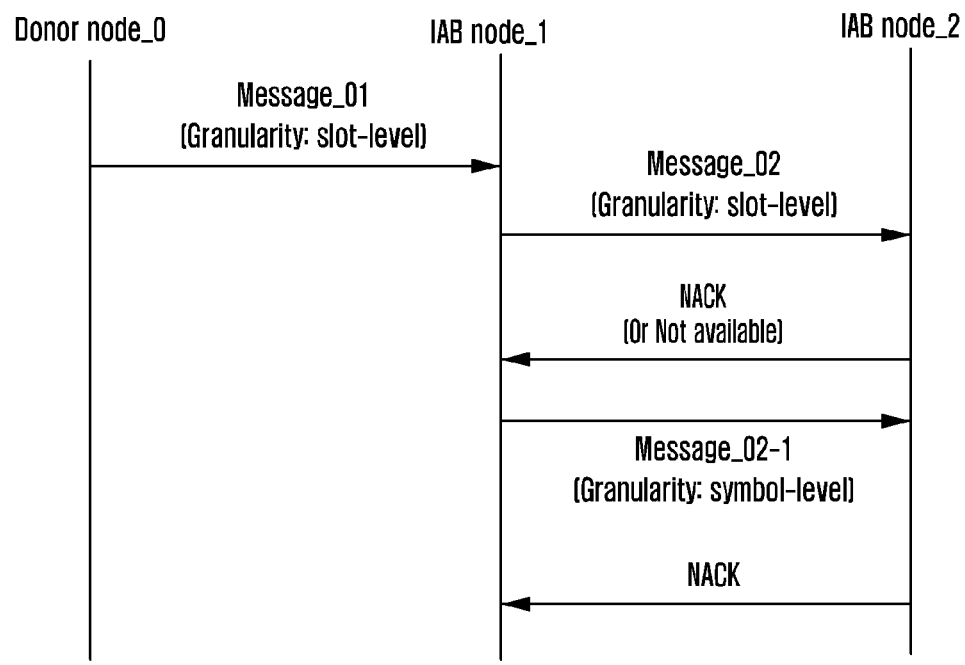

If all these attempts still fail to configure the child node, the parent node needs to remain its current duplexing pattern configuration and wait for the next configuration opportunity. In this case, additional messages as shown in FIG. 2D are involved, again in the same manner as shown in FIGS. 2B and 2C. Each IAB node will receive a message from its parent node indicating the duplexing pattern configuration and transmit a duplexing pattern configuration message to its child node.

The donor node 0 may later transmit a new duplexing configuration message01 as shown at the bottom of FIG. 2A. This may occur upon detection of a change in the volume of back haul data being received from child IAB nodes. Alternatively, this new duplexing configuration message may result from a detected change in IAB network topology, or it may be performed periodically. The skilled person will be aware that other factors may trigger the transmission of a new duplexing pattern configuration message. For a distributed approach to duplexing pattern configuration, as discussed below in connection with FIG. 4, it may be that a particular IAB node other than the donor node may transmit a new duplexing pattern configuration message to its child node to provide a new duplexing pattern configuration. This may result in the child node similarly transmitting a new duplexing pattern configuration to its child node and so on. That is, it may be that a duplexing pattern configuration message may require only a portion of the IAB chain to be reconfigured.

There will now be described two approaches to generating duplexing pattern configuration messages, referred to herein as a centralised approach and a distributed approach.

Figure 3:
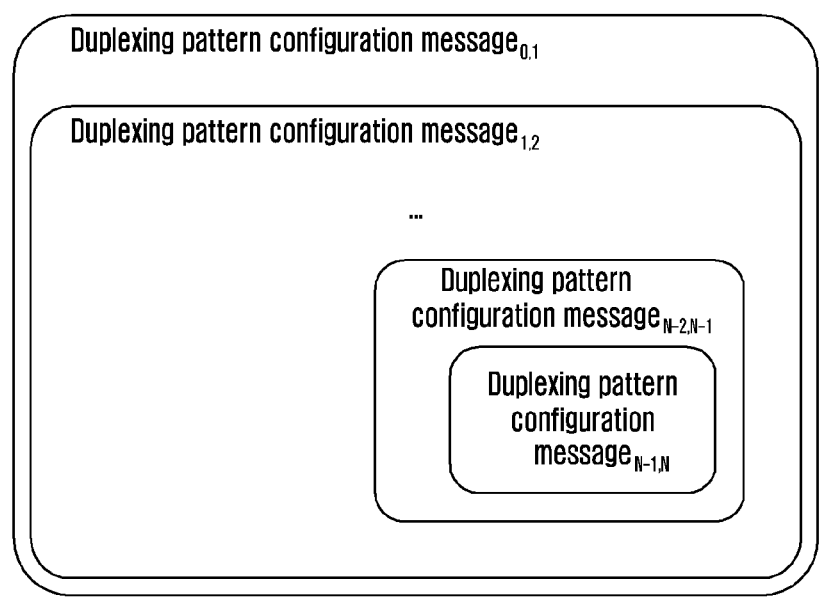
FIG. 3 illustrates an example of duplexing pattern configuration messaging according to a centralised approach.

In the centralised approach each duplexing pattern configuration message contains the duplexing pattern and identification for the recipient child node, grandchild nodes and forward through all subsequent IAB nodes. That is, the duplexing patterns are passed from the donor node on to each child node in a centralised manner. The donor node is responsible for deciding the duplexing patterns for all the nodes. A duplexing pattern configuration message according to the centralised approach is depicted in FIG. 3. It can be seen that a first duplexing pattern configuration message01 (transmitted from donor node0 to IAB node1) includes within itself a duplexing pattern configuration message12 (transmitted from IAB node1 to IAB node2), along with the duplexing pattern for the IAB node 1. Upon receipt of duplexing pattern configuration message01 IAB node 1 removes the duplexing pattern intended to be applied at IAB node 1 and forwards the duplexing pattern configuration message12 to IAB node2. A similar process is repeated through each IAB node until the final child node is reached. Each step along the chain removes its own duplexing pattern. It should be noted that the granularity of duplexing pattern can be different for different child nodes. For example, in message01, the duplexing pattern configuration for IAB node1 can be a symbol-level configuration and the duplexing pattern configuration for IAB node2 can be a slot-level configuration. Also, the duplexing patterns for different nodes are not necessarily the same, which provides more flexibility to minimize cross-link interference.

The centralised approach may be advantageous in a situation where the donor node has significantly more processing power than IAB nodes. In that situation the donor node may perform all the computation required for determining suitable duplexing patterns for each node, allowing for simpler implementations of IAB nodes. It may also be the case that the donor node has access to a greater amount of information regarding the performance of the network permitting it to more appropriately determine duplexing patterns and hence the allocation of air interface resources at each node. It may also be the case that the child nodes form a tree structure and hence the donor node can determine duplexing patterns for all children such that cross link interference is minimized.

Figure 4:
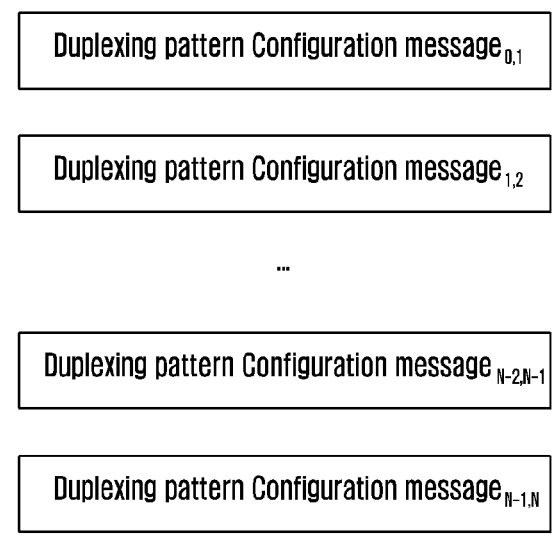
FIG. 4 illustrates an example of duplexing pattern configuration messaging according to a distributed approach.

In the distributed approach, a duplexing pattern configuration message contains only the duplexing pattern for the intended child node recipient. The duplexing pattern can be passed from an IAB node to a child node in a distributed manner. Each IAB node, as well as the donor node, only decides the duplexing pattern for its child node. The distributed approach is illustrated in FIG. 4 in which a series of duplexing pattern configuration messages for each node from donor node0 to IAB nodeN are shown entirely independent of one another. It should be noted that the granularity of duplexing pattern can be different for different child nodes. For example, the duplexing pattern configuration for IAB node1 can be a symbol-level configuration and the duplexing pattern configuration for IAB node2 can be a slot-level configuration. Also, the duplexing patterns for different nodes are not necessarily the same, which provides more flexibility to minimize cross-link interference.

The distributed approach may be advantageous in a situation in which the donor node does not have sufficient processing power to compute the entire setting of duplexing patterns for every node (for instance, where there is a large number. Additionally, it will be appreciated that for the centralised approach it is necessary for the donor to have full knowledge of topology of the whole IAB chain. In contrast, for the distributed approach, it is only necessary that each node receives its own duplexing pattern from its parent node and has knowledge of its child node or nodes.

In accordance with the distributed approach, the duplexing pattern for a child node generated by an IAB node depends on the duplexing pattern received from its parent. Particularly, this is necessary to ensure that the child node is configured to communicate with the IAB node during times when the IAB node must not itself communicate with its parent node. To enable the distributed approach, a duplexing pattern processor is provided at each IAB node. It will be appreciated that the duplexing pattern processor may be a processor dedicated task or may be a general purpose processor within the IAB node or a processor shared with another task performed by the IAB node.

Figure 5:
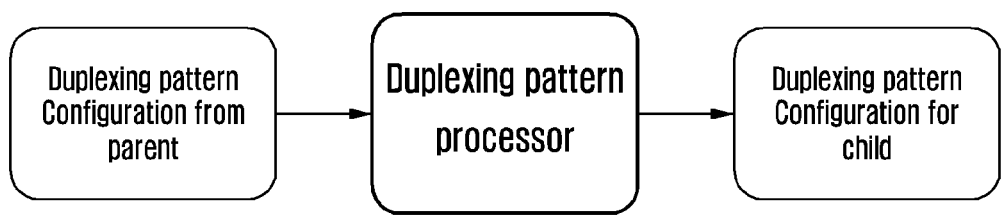
FIG. 5 illustrates an example of processing a duplexing pattern configuration according to the distributed approach.

FIG. 5 shows an example of processing the duplexing pattern configuration at an IAB node in accordance with the distributed approach. The duplexing pattern processor receives the duplexing pattern configuration for that IAB node from the parent node. The processor generates a suitable duplexing pattern configuration for its child node that will not conflict with its own duplexing pattern configuration. Avoiding conflict may comprise avoiding the need for the IAB node to transmit and receive data in the same slot/subframe/symbol.

The design of messages indicating duplexing pattern configurations will now be described. In each duplexing pattern the parent node needs to explicitly inform its child about backhaul uplink (BHU) and backhaul downlink (BHD) transmission slots/symbols/subframes: transmission slots/symbols/subframes for use communicating from the child node to the parent node and vice versa respectively. The duplexing pattern configuration message must include sufficient information to allow the child node to reserve these transmission slots/symbols/subframes for backhaul transmissions only (either BHU or BHD). The granularity of a duplexing pattern configuration can be slot/symbol/subframe level.

According to certain examples, the design of duplexing pattern configurations is in accordance with three principles. The first principle is that when switching from a downlink slot/symbol/subframe to an uplink slot/symbol/subframe an X slot/symbol/subframe should be inserted in the middle. An X slot/symbol/subframe is an unknown subframe, symbol or slot, or empty or blank, or may simply be disregarded. An X slot/symbol/subframe can be used either for UL and DL and may in certain examples contain signals for measuring the channel. This is necessary to guard the switching from downlink to uplink, and so prevent unstable behaviour. Tables 3 and 4 below provide examples of symbol level and slot level duplexing pattern configurations respectively. Each slot may comprise 14 symbol periods, such that it can be seen that symbol level duplexing patterns provide a greater level of granularity. It can be seen that for each respective format, one or more X symbols or slots can be provided each time a switch is made from downlink to uplink. In Tables 3 and 4 there are six exemplary formats presented for duplexing patterns. Each table is open ended and further formats may be defined according to the principles now described. BHU indicates BH uplink from the IAB node to its parent node for that slot/symbol/subframe. BHD indicates BH downlink to the IAB from the parent node to the IAB node. U indicates uplink either from an access device or a child node (according to the duplexing pattern defined for the child node). D indicates downlink either to an access device or a child node. Accordingly, on receiving a duplexing pattern from its parent node, an IAB node is able under the distributed approach to determine a duplexing pattern for its child node in which BHD and BHU slots/symbols/subframes are allocated in D and U slots/symbols/subframes respectively for its own duplexing pattern. It will be understood that each duplexing pattern configuration message includes a duplexing pattern for the recipient child node according to one of the example formats illustrated in Tables 3 and 4, or generated according to the same principles.

The second principle is that there exists a format whose BHU and BHD are in the subframes/symbols/slots of another format's BHD and BHU. For instance, Format 0 in Table 3 below has BHU at slot 3 and BHD at slot 5, while Format 2 in Table 3 has BHD at slot 3 and BHU at slot 5. As an example, for the case of a particular IAB node, the duplexing pattern provided by the parent node may be Format 0 of Table 3. This means the only symbol available to uplink transmit BH data is symbol 3 and the only symbol available to receive downlink BH data is 5. When configuring a duplexing pattern for the child node, symbol 3 cannot be uplink BH (because the IAB node will be occupied sending data instead of receiving data) and symbol 5 cannot be downlink (because the IAB node is occupied receiving data instead of sending data). It is therefore necessary that the duplexing pattern configured for the child node has the reverse arrangement such that symbol 3 is BHD and symbol 5 is BHU: the exact opposite to Format 0 at symbol 3 and symbol 5. As a result, for each specified format at least one 'dual' (at least for BHD and BHU) must be specified.

The third principle is that BHD and BHU subframes/symbols/slots can be converted to ordinary access downlink and uplink (D and U) subframes/symbols/slots. However, ordinary access downlink and uplink subframes/symbols/slots cannot be converted to BHD and BHU subframes/symbols/slots. BHD and BHU subframes/symbols/slots can be converted to ordinary access downlink and uplink subframes/symbols/slots to allow for more efficient use of resources. As an example, if an IAB node configures a BHU symbol at symbol 3 for its child node, the child will only transmit its BH data to the IAB node at symbol 3, if it has any BH data. However, sometimes a child node may not have BH data to send. In that case, the IAB node can use the BHU symbol for ordinary access uplink transmission, that is by scheduling a mobile device such as a user equipment, UE, to perform uplink to the IAB in symbol 3. This has no consequence for the child node, because the child node does not have anything to send. Whenever a child node has uplink data to send, it needs to send a scheduling request in the previous BHU to let the parent know it has uplink data. Then, the parent will use a BHD to tell the child when the next BHU is available for uplink data transmission. On the contrary, each child will always monitor certain areas in the BHD. If there is downlink data for a child, the child will download the data in the rest area in the BHD. This also causes no problem for the UE, because the IAB node is able to control when a UE sends uplink data: that is, whether the subframe, symbol or slot is labelled BHU or U is not relevant to the UE.

Table 3 and Table 4 show examples of symbol-level and slot-level duplexing pattern configurations. As noted above, BHU indicates an IAB node transmitting to its parent IAB node and BHD indicates an IAB node receiving from parent IAB node. For D, it could include DL access link and/or DL BH link to the child IAB node. For U, it could include UL access link and/or UL BH link from the child IAB node. X is the unknown subframe/slot/symbol providing a gap between DL and UL.

TABLE 3

Example of symbol-level duplexing pattern configurations.

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | X | U | BHU | U | BHD | X | U | U | D | D | X | U | U |
| 1 | D | X | U | BHU | D | BHD | X | U | U | D | D | X | U | U |
| 2 | D | X | U | BHD | X | BHU | U | U | U | D | D | X | U | U |
| 3 | D | X | U | BHU | U | BHD | D | D | X | U | BHU | U | BHD | D |
| 4 | D | X | U | BHU | D | BHD | D | D | X | U | BHU | D | BHD | D |
| 5 | D | X | U | BHD | X | BHU | D | D | X | U | BHD | X | BHU | D |
| 6 | D | X | U | BHD | X | BHU | D | D | X | U | BHD | X | BHU | U |
| ... | ... | ... | ... | ... | ... | ... | ... | ... | ... | ... | ... | ... | ... | ... |

TABLE 4

Example of slot-level duplexing pattern configurations.

| | Slot number | | | | | | | | | |
|---|---|---|---|---|---|---|---|---|---|---|
| FORMAT | 0 | 1 | 2 | 3 | 4 | 5 | 6 | 7 | 8 | 9 |
| 0 | D | X | U | BHU | U | BHD | X | U | U | D |
| 1 | D | X | U | BHU | D | BHD | X | U | U | D |
| 2 | D | X | U | BHD | X | BHU | U | U | U | D |
| 3 | D | X | U | BHU | U | BHD | D | BHD | X | BHU |
| 4 | D | X | U | BHU | D | BHD | D | BHD | X | BHU |
| 5 | D | X | U | BHD | X | BHU | U | BHU | U | BHD |
| 6 | D | X | U | BHD | X | BHU | U | BHU | D | BHD |
| ... | ... | ... | ... | ... | ... | ... | ... | ... | ... | ... |

There is now described the design of a signalling procedure for duplexing pattern configuration messaging. It will be appreciated that the traffic at an IAB node depends not only on its associated UEs but also its parent IAB node and child IAB node and thus is expected to be highly dynamic. The duration of adaptation period and granularity depends on such dynamic behaviour. The adaptation period refers to the time frame within which a duplexing pattern is defined and remains unchanged. Granularity defined on what scale one link type can switch to another link type, e.g., BH UL to BH DL. For instance, granularity may be at the level of the subframe, symbol or slot as discussed above. Symbol-level granularity has been supported in NR for dynamic Time Division Duplexing (TDD). The same granularity may be adopted for IAB TDM multiplexing patterns. Two alternatives can be considered for the adaptation period duration: for the first alternative, a fixed adaptation period, for example 1 slot, and for the second alternative a configurable adaptation period.

The second alternative—configurable adaptation periods—may be configured according to several different options: firstly, the period can be configured semi-persistently via upper layer signalling, e.g., RRC, Medium Access Control (MAC) layer Control Entity (CE) (MAC CE); secondly, the period can be configured dynamically via layer 1 signalling, e.g., PDCCH/DCI and the highest flexibility can be provided; thirdly, a combination of the first and second options can be applied, with semi-persistent configuration as initial configuration but can be overridden by dynamic configuration.

Considering the more complex multiplexing patterns, slot-level granularity can also be supported to reduce complexity and signalling overhead. The same alternatives set out above for symbol-level granularity can also be applied here except for dynamic configuration: once configured, a configuration will last at least for the duration of adaptation period. Table 5 shown below gives an example of defined durations for the adaptation period.

TABLE 5

Defined durations for the adaptation period.

| Index | Adaptation Period (slot) |
|---|---|
| 0 | 1 |
| 1 | 2 |
| 2 | 4 |
| 3 | 8 |
| 4 | 16 |
| 5 | 32 |
| 6 | 64 |

Table 5 shows how long the adaptation period is defined. For example, if 4 is configured for the adaptation period, it means the duration of one adaptation period is 16 slots.

For granularity, within the adaptation period, two further alternatives can be considered to indicate the multiplexing pattern (either symbol-level or slot-level). Either a bitmap may be used to indicate the active link type; or a pre-defined table may be used. For the option of a bitmap, we can define a one to one mapping between two indication bits and a certain link type as shown below in Table 6.

TABLE 6

A mapping between two indicator bits and a link type.

| Link type | Indication Bits |
|---|---|
| Parent BH DL | 00 |
| Parent BH UL | 01 |
| Access DL/Child BH DL | 10 |
| Access UL/Child BH UL | 11 |

The option for a bitmap is also illustrated in FIG. 6, and it provides maximum flexibility albeit with higher signalling overhead. For example, bits 00 represent L{P,DL}—that is, BH downlink from the parent node.

Figure 7:
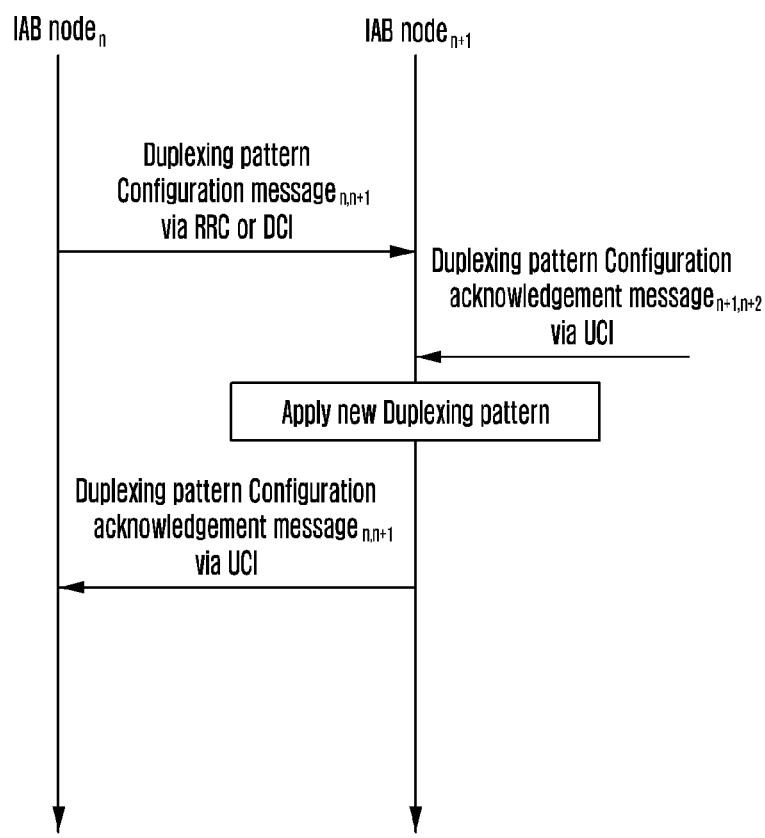
FIG. 7 illustrates an example of message transmission between IAB nodes.

There is now described how duplexing pattern configuration messages may be transmitted. Transmissions of a duplexing pattern configuration messages can be achieved by semi-persistent configuration (via radio resource control (RRC) signalling) or dynamic configuration (via downlink control information (DCI)). Transmission of duplexing pattern configuration acknowledgement messages can be sent via uplink control information (UCI). This is shown in FIG. 7.

The transmission of duplexing pattern configuration messages uses a table shared by all IAB nodes. This table can be a newly created table specifically for IAB nodes or an enhanced ordinary duplexing pattern table, e.g., Subframe Format Indicator (SFI) table, corresponding to Table 2 given above and derived from 3GPP TS 38.211. By using a table, whether that be a bespoke table or an expansion of Table 2, only a reference to the table needs to be provided in the duplexing pattern configuration messages, so long as each IAB node possesses or can access a copy of the table.

For a newly created table specifically for IAB nodes, Tables 3 and 4 given above may be used. For an enhanced ordinary duplexing pattern table, reserved entries can be used. An example can be found in Table 7 which expands Table 2 and rows 62 onwards are new.

TABLE 7

Example of enhanced symbol-level duplexing pattern configurations.

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| ... | ... | ... | ... | ... | ... | ... | ... | ... | ... | ... | ... | ... | ... | ... |
| 61 | D | D | X | X | X | X | U | D | D | X | X | X | X | U |
| 62 | D | X | U | BHU | U | BHD | X | U | U | D | D | X | U | U |
| 63 | D | X | U | BHU | D | BHD | X | U | U | D | X | X | U | U |
| 64 | D | X | U | BHD | X | BHU | U | U | U | D | D | X | U | U |
| 65 | D | X | U | BHU | U | BHD | D | D | X | U | BHU | U | BHD | D |
| 66 | U | X | U | BHU | D | BHD | D | D | X | U | BHU | D | BHD | D |
| 67 | D | X | U | BHD | X | BHU | D | D | X | U | BHD | X | BHU | D |
| 68 | D | X | U | BHD | X | BHU | D | D | X | U | BHD | X | BHU | U |
| ... | ... | ... | ... | ... | ... | ... | ... | ... | ... | ... | ... | ... | ... | ... |

Figure 8:
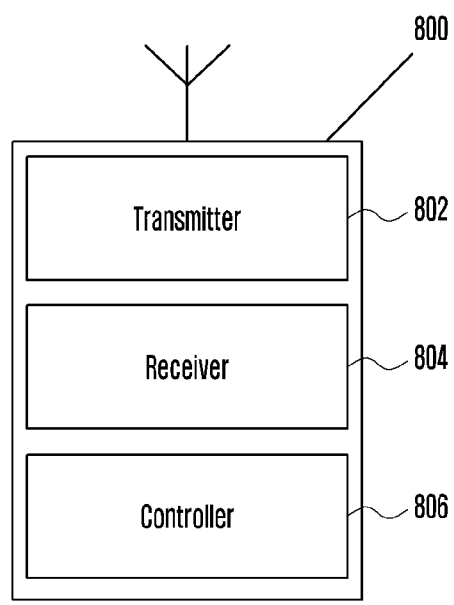
FIG. 8 illustrates an example of a structure of an IAB node.

FIG. 8 provides a schematic diagram of the structure of an IAB node 800 which is arranged to operate in accordance with the examples described above. The IAB node 800 includes a transmitter 802 arranged to transmit signals to a parent node, a child node or an access device; a receiver 604 arranged to receive signals from a parent node, a child node or an access device; and a controller 806 arranged to control the transmitter and receiver and to perform processing such as in accordance with the above described methods.

Although in FIG. 8 the transmitter, receiver, and controller have been illustrated as separate elements, any single element or plurality of elements which provide equivalent functionality may be used to implement the examples of the present invention described above.

Embodiments of the present invention provide several means by which the problems identified in the prior art may be addressed. Details of these follow. In the following, reference is made to solutions 1-A and 1-B to conform to the terminology used in the standardisation process.

Solution 1-A

For solution 1-A, the same set of SSBs will be used for both access UEs and inter IAB node discovery. In such a case, a mechanism is needed to make sure that one IAB node can hear from another IAB node subject to half-duplex constraint. In such a case, a muting pattern or scheme is needed and the following two alternatives may be used.

Alt1: muting pattern in SSB burst set level;
Alt2: muting pattern in SSB level within one SSB burst set.

Alt1

For the SSB burst set level muting, an entire SSB burst set needs to be muted to listen to SSB from other IAB nodes, causing a significant impact on access UEs. However, it has been agreed that the impact on Rel-15 UE should be minimized so that such muting may not be optimal for access UEs. On the contrary, within one SSB burst set, the positions of SSB from multiple IAB nodes may be coordinated to enable inter node discovery subject to the half-duplex constraint.

Alt2

Within each SSB burst set, there are multiple positions to transmit SSBs. However, the SSB positions are only possible positions. In other words, it is not mandated that an SSB should be transmitted in all the possible locations. Anything from a single SSB up to maximum number of SSBs within one SSB burst set is possible depending on beam sweeping requirements.

Figure 9:
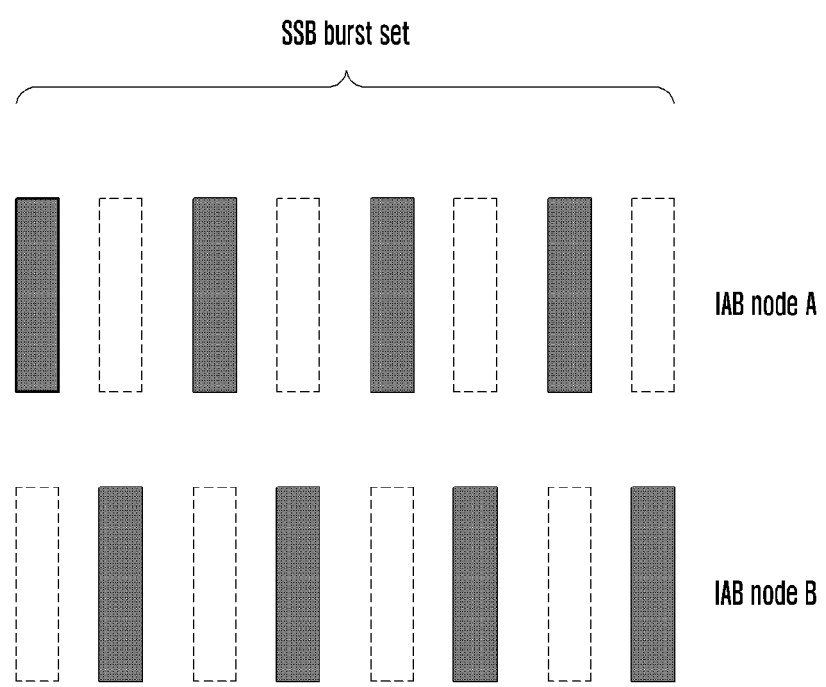
FIG. 9 shows coordinated SSBs within one SSB burst set for inter-node discovery, according to an embodiment of the present invention.

In such a case, one IAB node A can transmit on one subset of all possible positions and another IAB node B can transmit on another subset, not overlapping with subset of IAB node A as shown in FIG. 9. The dashed boxes indicate the muted SSB transmission positions without actual SSB transmission. Both IAB node A and B can use these muted SSBs to listen to each other. This can be done via ssb-PositionsInBurst in SIB1. Different SSB subsets might need to be chosen for different SSB burst set to measure all possible beam directions. In other words, the scheme shown in FIG. 9, where node A transmits on odd positions and node B transmits on even positions, is only exemplary and other muting schemes can be used as required.

In this regard, each IAB node needs to choose a subset within one SSB burst set and this can be done either in semi-persistent (via RRC) or dynamic (via DCI) manner. Two further alternatives are possible:

Alt2.1: centralized configuration, where the donor IAB node or the parent IAB node configure a different subset for all child IAB nodes or only its next level child IAB nodes;

Alt2.2: distributed configuration, where each IAB node exchanges its own SSB configuration with its surrounding IAB nodes and the surrounding IAB nodes adjust their SSB configuration to choose a different SSB subset.

Solution 1-B

For solution 1-B, SSBs which are orthogonal (TDM and/or FDM) with SSBs for access UEs are used for inter IAB node discovery so that there is no impact on access UE. Subject to half-duplex constraint, each IAB node might need to mute some of its own SSBs to listen to SSBs from other IAB nodes. Orthogonal resources for backhaul and access link detection and measurement can be achieved via SSB muting across IAB nodes. During those muted SSBs, IAB nodes can listen to SSBs from other IAB nodes to detect potential candidate backhaul links. However, it should be noted that such muting is only needed when the SSB transmissions are aligned for those IAB nodes that require measurement of SSBs to monitor the quality of backup backhaul links between each other. In particular, IAB nodes within the same hop could align their SSB transmissions to optimize the signalling overhead. However, between different hops, other reference signals and more flexible measurement can be considered.

In order to introduce muting pattern, two alternatives are presented:

Alt1: Muting across all IAB nodes;

Alt2: Muting based on hop order, i.e., muting pattern within each hop.

Alt1

Figure 10:
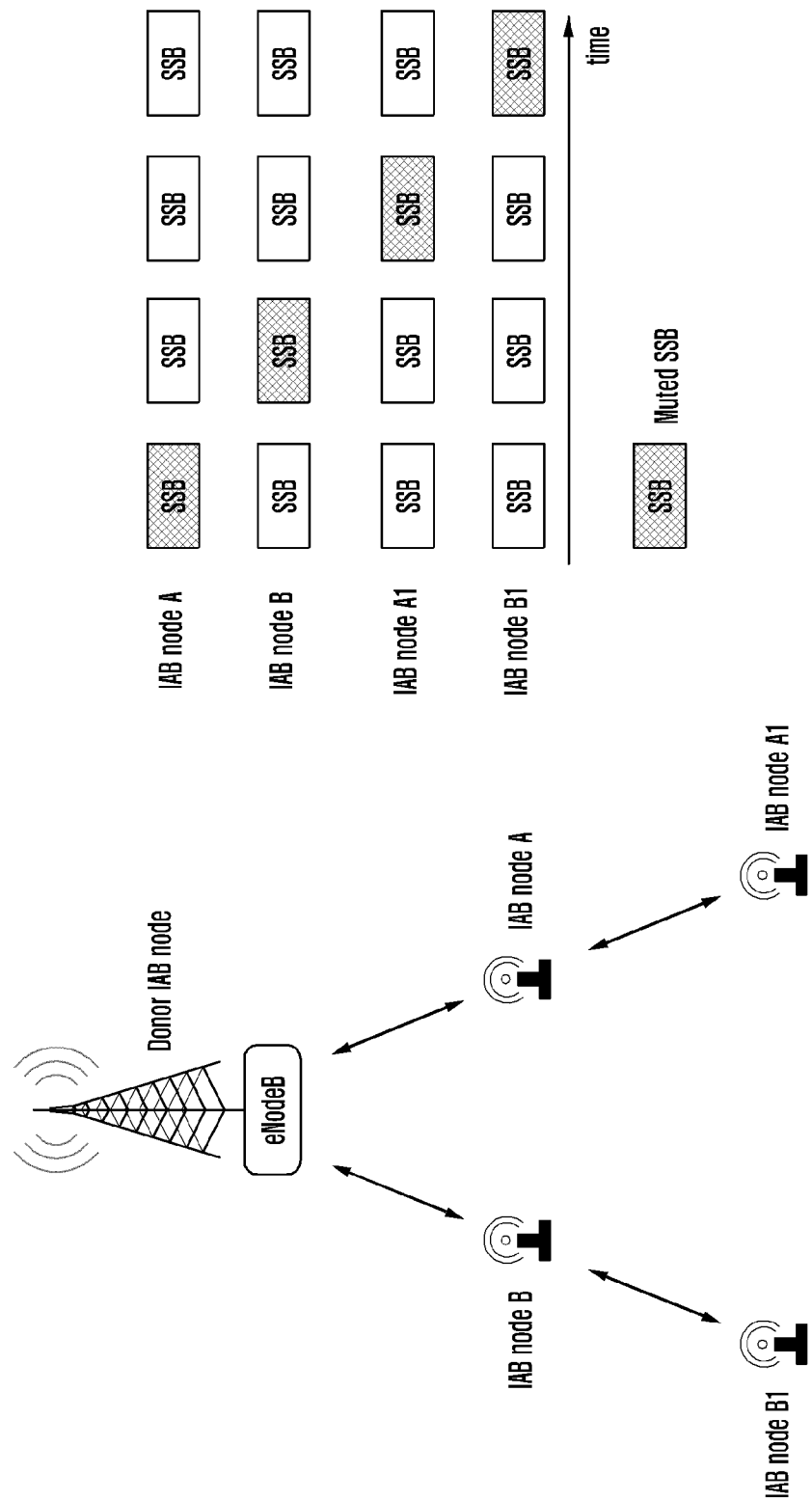
FIG. 10 shows a muting scheme (across all IAB nodes), according to an embodiment of the present invention.

The first solution is illustrated in FIG. 10 (tree and muting). The muting is across all IAB nodes no matter which hop they belong to. The benefit of such configuration is that one IAB node can always measure all possible backhaul links including both primary and backup ones and it is independent of topology change. However, the scalability of such configuration may be limited since it requires higher signalling overhead, scaling with total number of IAB nodes involved in inter IAB node SSB measurement.

Alt2

Figure 11:
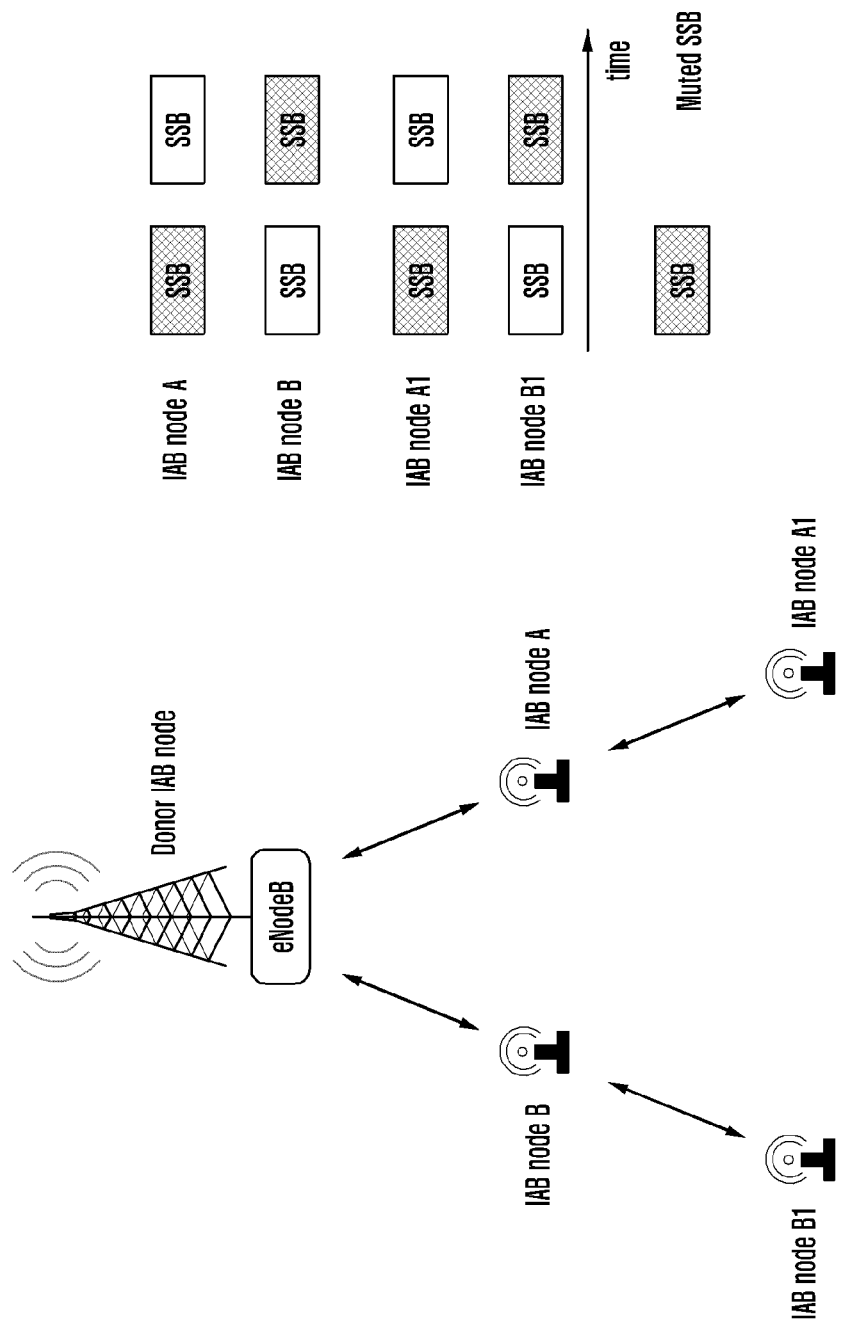
FIG. 11 shows a muting scheme based on hop order, according to an embodiment of the present invention.

The second solution is shown in FIG. 11, where the muting is constrained between IAB nodes belonging to the same hop (i.e. the same number of node connections away from the Donor node). In such a case, two alternatives can be considered:

Alt2.1: the SSB transmissions are aligned across all IAB nodes; and

Alt2.2: the SSB transmissions are aligned across IAB nodes belonging to the same hop only.

Alt2.1

One IAB node can measure all backup backhaul links via SSBs, irrelevant of hop order. Such a configuration can reduce the signalling overhead since the required number of SSBs is equal to the total number of IAB nodes involved in inter IAB node SSB measurement with in each hop. Therefore, the scalability of this approach is improved compared with the first solution.

Alt2.2

Figure 12:
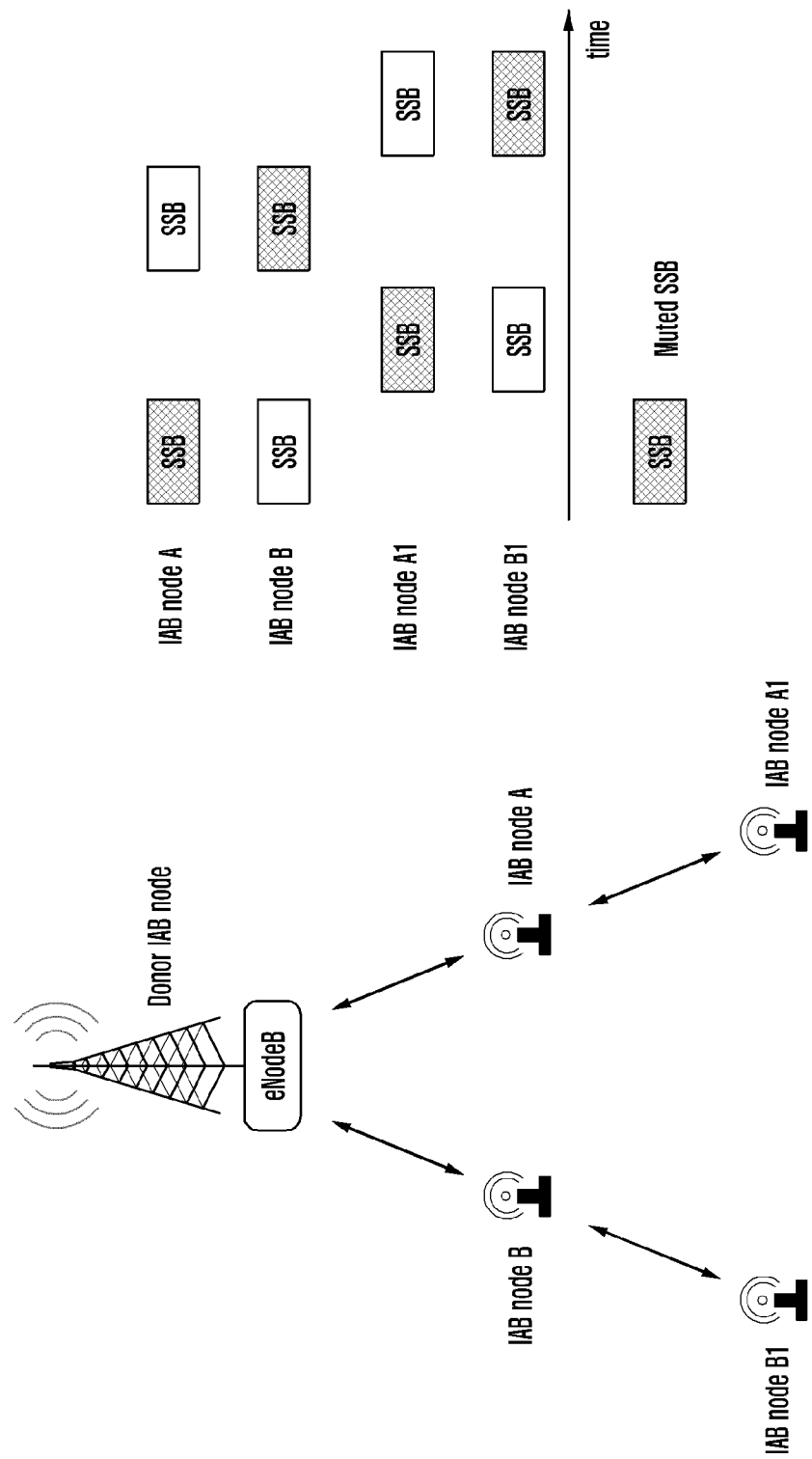
FIG. 12 shows a further a muting scheme based on hop order, according to an embodiment of the present invention.

One IAB node might not be able to measure the SSBs from other IAB nodes belonging to a different hop. However, as mentioned above, such a measurement is not necessarily based on SSBs only but may use other reference signals, e.g., CSI-RS/ZP CSI-RS, since half-duplex constraint does not limit IAB nodes with hop order N and N+1. Allowing non-overlapping SSBs between different hops as shown in FIG. 12 may improve resource allocation flexibility and thus achieve higher resource usage efficiency. It should be noted that the configuration of SSBs depends on topology and any topology change might incur re-configuration of SSBs as discussed in the following.

As mentioned above, for Alt1, the configuration of SSBs, e.g., number of SSBs within one measurement cycle, depends on the total number of IAB nodes involved in inter-IAB node discovery and measurement. Any topology change does not have an impact on this number.

However, for Alt2, the total number of SSBs within one measurement cycle is equal to the maximum number of IAB nodes involved in inter-IAB node discovery and measurement belonging to the same hop so any topology change here has an impact on the configuration of SSBs. In order to support more dynamic topology change, at least semi-persistent configuration/reconfiguration of SSBs, e.g., via RRC, for inter-IAB node discovery and measurement is supported and dynamic configuration may also be considered, as required.

For solution 1-B, the orthogonality can be achieved as follows:

TDM only: in such a case, access UE might detect inter-node discovery SSB, which might not include SIB1 information since only signal strength measurement is needed.

Alt1: Same SSB transmission timing across all IAB nodes which leads to the same SSB configuration for all IAB nodes without flexibility Alt2: Different SSB transmission timing across different IAB nodes so that different configurations can be applied to different IAB nodes but a common SMTC can be configured. For example, SSB offset can be defined based on hop order, which can be implicitly derived by IAB nodes.

TDM+FDM: in such a case, access UE does not detect inter-node discovery.

Embodiments of the invention provide different SMTC configuration in certain circumstances. A different SMTC orthogonal to access UE SMTC may be configured for IAB nodes to measure the SSBs. For connected state, two SMTCs can be configured and the second one has a different periodicity only. In order to configure this additional SMTC for IAB inter-node discovery, based on the current agreements, the following alternatives can be considered:

Alt 1: Additional offset values is needed for SMTC2

Alt 2: SMTC3 can be configured.

For idle state, only one SMTC should be configured. However, for inter-node discovery, at least two SMTCs should be configured for both connected and idle state. In this regard, it is necessary to allow two SMTCs to be configured in idle state.

The SMTC configuration should take the SSB configurations mentioned previously into consideration to enable semi-persistent and dynamic measurement supporting dynamic topology change. In this regard, SMTC configuration needs to support both semi-persistent and dynamic configuration.

For a measurement metric, RSRP/RSSI/SINR/RSRQ can be used and reported. Two alternatives can be considered for reporting measurement results:

Alt1: report back to the parent IAB node and then to the donor IAB node so that the donor IAB node can collect all information and choose appropriate backup backhaul links once the primary backhaul links fails;

Alt2: report back to the IAB node which is transmitting SSB so that each IAB node knows which backup backhaul links to use once the primary backhaul links fail.

The composition of inter IAB node discovery SSB may require modification. In the Physical Broadcast Channel (PBCH) of an SSB, Master Information Block (MIB) is carried to the UEs in order to acquire the remaining system information broadcast by the network. Some of this information might not be needed since discovery SSB is mainly used to measure backup link quality, which can be based on signal strength measurement in terms of RSRP, and there is no need to actually know any further details. Therefore, the size of PBCH within an inter IAB node discovery SSB can be made smaller to reduce signalling overhead. The following alternatives can be considered:

Alt1: Remove PBCH from SSB so that SSB only consists of Primary synchronization signal (PSS) and Secondary synchronization signal (SSS);

Alt2: Reduce the size of PBCH so it only includes certain necessary information, e.g., CellBarred Flag;

Alt3: Only keep DMRS of PBCH for measurement, the rest of the REs for MIB can either be removed or muted to save energy.

For both alternatives, the length of PSS and SSS can be increased so that a lower SINR can be achieved for initial access, which is needed since the distance between IAB nodes is normally larger than that between an IAB node and a UE.

Once a backhaul link of an IAB node is blocked and a backup backhaul link is needed, an Out of Synchronization (OOS) event happens and the IAB node needs to perform synchronization again. There are two alternative approaches possible:

Alt1: IAB node can use the inter-node discovery SSBs orthogonal to the initial access SSBs for backup backhaul link initial access and synchronization;

Alt2: IAB node can use the initial access SSBs directly for backup backhaul link initial access and synchronization.

For the second alternative, the IAB node needs to do synchronization again as if it is accessing the network for the first time, i.e., it follows the stage 1 procedure.

The SSBs discussed above are for inter-node discovery and measurement. In the following, SSB configuration for IAB node MT initial access is described.

Both NSA and SA cases are considered. Two cases can be considered for a NSA deployment:

Case 1: The IAB node MT can perform initial access on a LTE carrier so that the NSA deployment is from both access UE and IAB node MT (Mobile Terminal) perspectives;

Case 2: The IAB node MT can only perform initial access on a NR carrier so that the NSA deployment is only from an access UE perspective.

For case 1, since IAB node MT has already synchronized with donor gNB on a LTE carrier via an LTE PCell and the NR frequency carrier can be further added via the EN-DC procedure, a longer periodicity for IAB node MT initial access can be assumed to reduce power consumption as well as the signalling overhead and such periodicity can be signalled via the established link on a LTE carrier using e.g., RRC.

For case 2, the IAB node MT needs to perform initial access on a NR carrier without any previously established LTE links so that periodicity signalling as in case 1 is impossible, i.e., no assumptions at the network side can be made. The IAB node MT needs to assume SSB periodicity for initial access. Three alternatives can be considered as follows:

Alt1: The IAB node MT assumes the same SSB periodicity as access UE, i.e., 20 ms.

Alt2: The IAB node MT assumes longer SSB periodicity than access UE, i.e., a value from 40 ms, 80 ms and 160 ms.

Alt3: The IAB node MT can assume the same SSB periodicity as access UE when accessing the network for the first time and then assumes longer periodicity, which can be configured by the donor or parent IAB nodes, when accessing the network the second time and onward, e.g. when OOS happens.

In order to support Alt2 and Alt3, the IAB node MT needs to know it is IAB node but not a normal access UE. Such information needs to be configured to the IAB nodes even before it is activated and made available once the IAB node is activated. It can be a Boolean indicator with two initial configuration states e.g.: "0" means the current device is access UE device and "1" means the current device is IAB node. With such information, the IAB node MT knows it should assume a different SSB periodicity.

It should be noted that when a longer periodicity is assumed by IAB node MT on NR carrier, an access UE assumes the original periodicity, e.g., 20 ms.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present invention may also be implemented via computer executable instructions stored on a computer readable storage medium, such that when executed cause a computer to operate in accordance with any other the aforementioned embodiments.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the invention, which is defined in the accompanying claims.

The invention claimed is:

1. A method of operating an Integrated Access Backhaul (IAB) node in a wireless communication network, the IAB node being arranged to communicate backhaul traffic wirelessly with a donor IAB node, the method comprising:
   receiving, from the donor IAB node, a first duplexing pattern configuration message including a first duplexing pattern indicating a first configuration of slots within a transmission frame and an identification for a child node of the IAB node;
   transmitting, to the donor IAB node, a non-acknowledgement message, as a response to the first duplexing pattern configuration message;
   receiving, from the donor IAB node, a second duplexing pattern configuration message including a second duplexing pattern indicating a second configuration of symbols in a slot;
   transmitting, to the donor IAB node, an acknowledgement message, as a response to the second duplexing pattern configuration message; and
   applying the second duplexing pattern indicating the second configuration of symbols in the slot included in the second duplexing pattern configuration message received from the donor IAB node.

2. The method of claim 1, further comprising:
   determining a third duplexing pattern for the child node corresponding to the identification, based on the first duplexing pattern included in the first duplexing pattern configuration message received from the donor IAB node;
   transmitting, to the child node, a third duplexing pattern configuration message including the third duplexing pattern indicating a third configuration of slots within a transmission frame; and
   receiving, from the child node, a non-acknowledgement message as a response to the third duplexing pattern configuration message; and
   transmitting, to the child node, a fourth duplexing pattern configuration message including a fourth duplexing pattern indicating a fourth configuration of symbols in a slot.

3. The method of claim 2, wherein determining the third duplexing pattern for the child node comprises determining the third duplexing pattern for the child node arranged to prevent data transmission and data reception conflict for the IAB node in a particular time period.

4. The method of claim 1, wherein the first duplexing pattern includes an X transmission slot, between a downlink transmission slot, and a subsequent uplink transmission slot.

5. The method of claim 1, wherein the first duplexing pattern indicates slots for the IAB node to perform:
   backhaul uplink, BHU;
   backhaul downlink, BHD;
   uplink, U, from the child node or an access device; or
   downlink, D, to the child node or an access device.

6. The method of claim 5, further comprising:
   converting a BHD or BHU slot, within the first duplexing pattern received from the donor IAB node into a D or U slot.

7. The method of claim 1, wherein the first duplexing pattern configuration message is transmitted by semi-persistent configuration, via radio resource control, RRC, signalling or dynamic configuration, via downlink control information, DCI, and
   wherein the acknowledgement message is transmitted via uplink control information, UCI.

8. The method of claim 1, wherein the first duplexing pattern corresponds to a format among formats defined for an access node and formats defined for an IAB node.

9. An Integrated Access Backhaul (IAB) node in a wireless communication network, the IAB node being arranged to communicate backhaul traffic wirelessly with a donor IAB node, the IAB node comprising:
   a transmitter and a receiver; and
   a controller coupled with the transmitter and the receiver and configured to:
   control the receiver to receive, from the donor IAB node, a first duplexing pattern configuration message including a first duplexing pattern indicating a first configuration of slots within a transmission frame and an identification for a child node of the IAB node,
   control the transmitter to transmit, to the donor IAB node, a non-acknowledgement message, as a response to the first duplexing pattern configuration message,
   control the receiver to receive, from the donor IAB node, a second duplexing pattern configuration message including a second duplexing pattern indicating a second configuration of symbols in a slot,
   control the transmitter to transmit, to the donor IAB node, an acknowledgement message, as a response to the second duplexing pattern configuration message, and
   apply the second duplexing pattern indicating the second configuration of symbols in the slot included in the second duplexing pattern configuration message received from the donor IAB node.

10. A method of operating a donor Integrated Access Backhaul (IAB) node in a wireless communication network, the donor IAB node being arranged to communicate backhaul traffic wirelessly with an IAB node, the method comprising:
   transmitting, to the IAB node, a first duplexing pattern configuration message including a first duplexing pattern indicating a first configuration of slots within a transmission frame and an identification for a child node of the IAB node;
   receiving, from the IAB node, a non-acknowledgement message, as a response to the first duplexing pattern configuration message;

transmitting, to the IAB node, a second duplexing pattern configuration message including a second duplexing pattern indicating a second configuration of symbols in a slot;
receiving, from the IAB node, an acknowledgement message, as a response to the second duplexing pattern configuration message; and
applying the second duplexing pattern indicating the second configuration of symbols in the slot as a response to receiving the acknowledgement message.

* * * * *